(12) United States Patent
Barti et al.

(10) Patent No.: US 11,549,557 B2
(45) Date of Patent: Jan. 10, 2023

(54) SHAFT-HUB CONNECTION AND DRIVE TRAIN HAVING A SHAFT-HUB CONNECTION OF THIS TYPE

(71) Applicant: Bayerische Motoren Werke Aktiengesellschaft, Munich (DE)

(72) Inventors: Endre Barti, Munich (DE); Jerome Ragot, Munich (DE); Anastasios Vichos, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 715 days.

(21) Appl. No.: 16/560,324

(22) Filed: Sep. 4, 2019

(65) Prior Publication Data

US 2019/0390717 A1 Dec. 26, 2019

Related U.S. Application Data

(63) Continuation of application No. PCT/EP2018/054338, filed on Feb. 22, 2018.

(30) Foreign Application Priority Data

Mar. 8, 2017 (DE) ...................... 10 2017 203 773.3

(51) Int. Cl.
*F16D 1/064* (2006.01)
*H02K 7/00* (2006.01)

(52) U.S. Cl.
CPC ............. *F16D 1/064* (2013.01); *H02K 7/003* (2013.01); *H02K 7/006* (2013.01); *F16D 2300/12* (2013.01)

(58) Field of Classification Search
CPC .... F16D 1/064; F16D 1/0858; F16D 2300/12; H02K 7/003; H02K 7/006
See application file for complete search history.

(56) References Cited

U.S. PATENT DOCUMENTS

| | | | | |
|---|---|---|---|---|
| 2008/0012329 | A1* | 1/2008 | Dewhirst | F16D 1/072 285/382 |
| 2011/0116863 | A1* | 5/2011 | Kochsiek | F16D 1/0858 403/360 |

(Continued)

FOREIGN PATENT DOCUMENTS

| | | |
|---|---|---|
| CN | 101978185 A | 2/2011 |
| CN | 203243131 U | 10/2013 |

(Continued)

OTHER PUBLICATIONS

International Search Report (PCT/ISA/210) issued in PCT Application No. PCT/EP2018/054338 dated Jun. 1, 2018 with English translation (five pages).

(Continued)

*Primary Examiner* — Naishadh N Desai
(74) *Attorney, Agent, or Firm* — Crowell & Moring LLP

(57) ABSTRACT

A shaft-hub connection including a hub element and a shaft element is provided. The hub element includes a hub. The shaft element includes at least one first elongated region arranged in at least one second elongated region of the hub and is at least rotationally fixed to the hub element by way of a longitudinal press-fit including the elongated regions. The longitudinal press-fit has at least one first excess region with a first excess, and at least one second excess region, following the first excess region in the circumferential direction of the shaft element, with a second excess that is smaller than the first excess.

11 Claims, 1 Drawing Sheet

(56) References Cited

U.S. PATENT DOCUMENTS

2014/0016999 A1* 1/2014 Kinoshita ................ B25J 17/02
  403/371
2019/0390717 A1* 12/2019 Barti .................... F16D 1/0858

FOREIGN PATENT DOCUMENTS

| CN | 104350299 A | 2/2015 | |
|----|----|----|----|
| DE | 10 2009 060 352 A1 | 6/2011 | |
| DE | 20 2013 004 236 U1 | 7/2013 | |
| DE | 202013004236 U1 * | 8/2013 | ............... F16D 1/10 |
| DE | 102013105915 A1 * | 12/2014 | ........... F16D 1/0858 |
| DE | 10 2015 007 470 A1 | 12/2015 | |
| DE | 102017201578 A1 * | 8/2018 | |
| EP | 1 900 951 A1 | 3/2008 | |
| EP | 1900951 A1 * | 3/2008 | ............. F16D 1/072 |
| EP | 2811193 A1 * | 12/2014 | ........... F16D 1/0858 |
| JP | 2015-77920 A | 4/2015 | |
| JP | 2015077920 A * | 4/2015 | |
| WO | WO-2019206556 A1 * | 10/2019 | ............. B60K 17/22 |

OTHER PUBLICATIONS

German-language Written Opinion (PCT/ISA/237) issued in PCT Application No. PCT/EP2018/054338 dated Jun. 1, 2018 (five pages).

German-language Search Report issued in counterpart German Application No. 10 2017 203 773.3 dated Feb. 6, 2018 with partial English translation (12 pages).

Chinese language Office Action issued in Chinese Application No. 201880005408.4 dated Dec. 17, 2020 with English translation (12 pages).

* cited by examiner

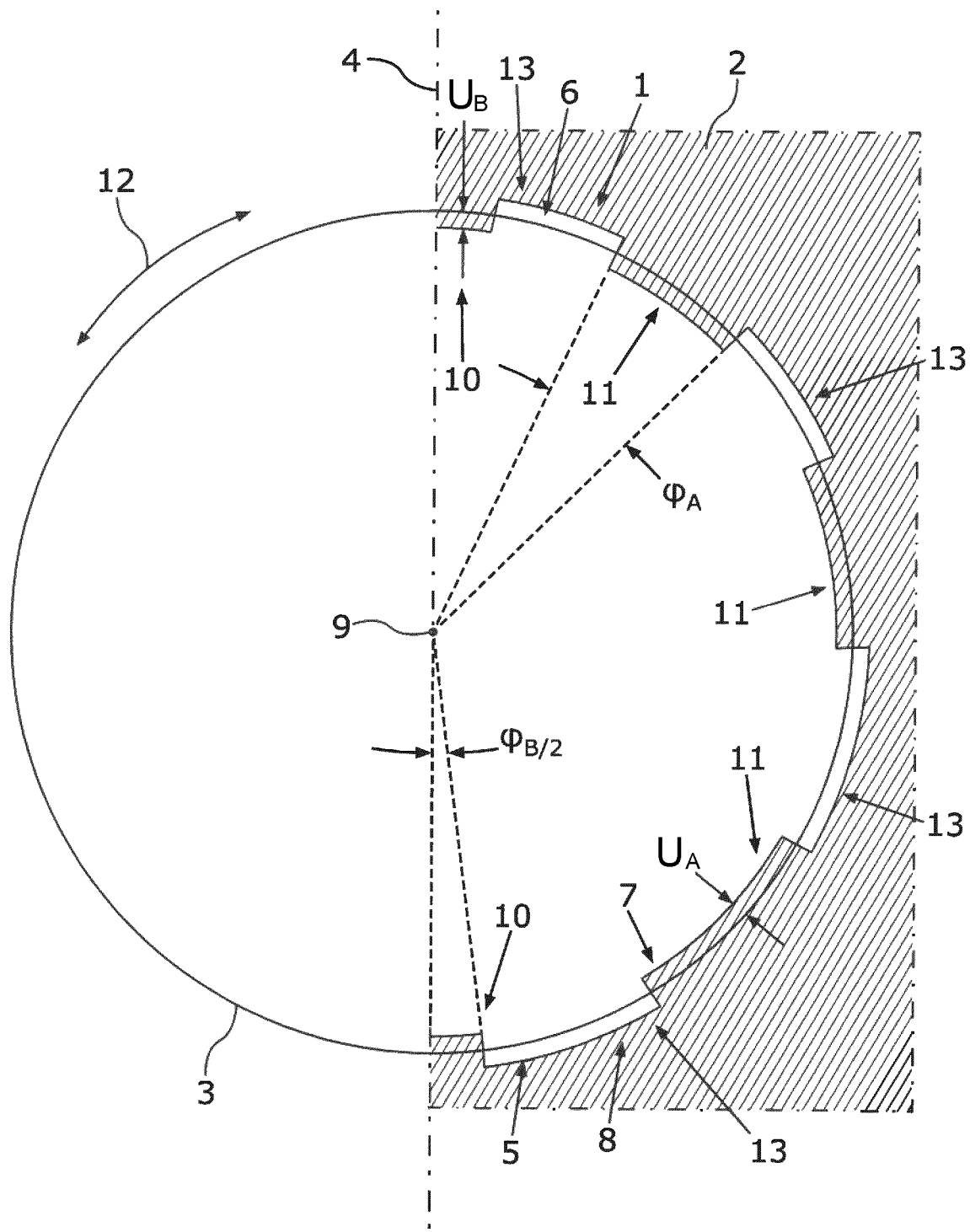

SHAFT-HUB CONNECTION AND DRIVE TRAIN HAVING A SHAFT-HUB CONNECTION OF THIS TYPE

CROSS REFERENCE TO RELATED APPLICATIONS

This application is a continuation of PCT International Application No. PCT/EP2018/054338, filed Feb. 22, 2018, which claims priority under 35 U.S.C. § 119 from German Patent Application No. 10 2017 203 773.3, filed Mar. 8, 2017, the entire disclosures of which are herein expressly incorporated by reference.

BACKGROUND AND SUMMARY OF THE INVENTION

Shaft-to-hub connections of this type, in particular for motor vehicles, as well as drive trains for motor vehicles having such shaft-to-hub connections are well known from the general prior art and in particular from the volume production of vehicles. Such a shaft-to-hub connection includes a hub element which has a hub. The shaft-to-hub connection furthermore includes a shaft element which has at least one first longitudinal region. At least the first longitudinal region herein is disposed in at least one second longitudinal region of the hub, wherein the shaft element by way of a longitudinal press-fit that includes the longitudinal regions is connected to the hub part at least in a rotationally-fixed manner. As is well known, the longitudinal press-fit is a press-fit which is usually formed in that the shaft element at least in the first longitudinal region forms an excess in relation to the hub, or in relation to the second longitudinal region of the hub, respectively.

This excess is usually formed in that the shaft element, in a state in which the shaft element is not yet connected to the hub element by way of the longitudinal press-fit and is thus not yet disposed in the hub, at least in the first longitudinal region has an external circumference, or an external diameter, respectively, which is larger than an internal circumference, or an internal diameter, respectively, which the hub in the aforementioned state in which the shaft element is not yet connected to the hub element by way of the longitudinal press-fit and thus is not yet disposed in the hub has at least in the second longitudinal region.

The longitudinal press-fit is usually produced in that the hub element under an axial force is pressed over the hub onto the shaft element, or onto the first longitudinal region, respectively, or in that the shaft element under an axial force is pressed into the hub and thus into the hub element and herein at least into the second longitudinal region, respectively. On account thereof, the hub element is connected, that is to say joined, to the hub element at least in a rotationally-fixed manner. On account of the above-mentioned excess a press-fit is created between the shaft element and the hub element after the joining, in particular between the longitudinal regions, such that the longitudinal press-fit is formed on account of said press-fit.

It is an object of the present invention to refine a shaft-to-hub connection and a drive train of the type mentioned at the outset in such a manner that a particularly cost-effective and time-effective assembly is capable of being implemented at identical requirements in terms of resistance to high rotating speeds, thermal resistance, and transmission of torque.

This and other objects are achieved according to the invention by a shaft-to-hub connection including a hub element and a shaft element, as well as by a drive train including a hub element and a shaft element in accordance with embodiments of the invention. Various other advantageous design embodiments of the invention are also provided in accordance with embodiments of the invention.

A first aspect of the invention relates to a shaft-to-hub connection, in particular for a drive train of a motor vehicle. The shaft-to-hub connection includes a hub element which has a hub. The shaft-to-hub connection furthermore includes a shaft element which has at least one first longitudinal region which is disposed in at least one second longitudinal region of the hub. The shaft element herein by way of a longitudinal press-fit that includes the longitudinal regions is connected, that is to say joined, to the hub part at least in a rotationally-fixed manner. This means that at least one press-fit is formed between the longitudinal regions and thus between the shaft element and between the hub element, on account of which the longitudinal press-fit is formed.

In order for a particularly cost-effective and time-effective assembly to now be able to be achieved in a simple and cost-effective manner, in particular without any negative effect on the transmission of torque, the thermal resistance, and the resistance to high rotating speeds, it is provided according to the invention that the longitudinal press-fit has at least one first excess region having a first excess and, so as to follow the first excess region in the circumferential direction of the shaft element, at least one second excess region having a second excess that is smaller in relation to the first excess. This means that the first excess has a first value, and the second excess has a second value that is lower in relation to the second value such that, on account of the respective excess and thus the respective excess region, a respective press-fit between the longitudinal regions, or between the shaft element and the hub element, is indeed formed, but the excess regions have different excesses, or the excesses have mutually different values, respectively. According to an embodiment of the invention, the longitudinal press-fit is thus provided with a variable excess, in particular in the circumferential direction of the shaft element so as to, on account thereof, be able to implement a particularly fixed, in particular rotationally-fixed, connection between the shaft element and the hub element, on the one hand and, while considering a maximum joining force, be able to implement a particularly large contact face between the shaft and the hub element up to a desired rotating speed, on the other hand. For example, the large contact face is advantageous for a transmission of torque as well as for a dissipation of heat from the shaft element by way of the hub element, or vice versa from the hub element by way of the shaft element.

In order for a particularly advantageous assembly to be implemented it has proven advantageous for the longitudinal press-fit, so as to follow the second excess region in the circumferential direction of the shaft element, to have at least one third excess region having a third excess that is different in relation to the second excess. For example, the third excess is larger or smaller than the second excess. For example, the third excess is smaller or larger than the first excess, or the third excess is equal to the first excess. It is thus possible for the longitudinal press-fit to have a plurality of gradations of the excess.

In order for a particularly advantageous assembly to be able to be implemented it is provided in one advantageous design embodiment of the invention that the first excess region in the circumferential direction of the shaft element extends across a first angle or angular range, respectively, wherein the second excess region in the circumferential direction of the shaft element extends across a second angle or angular range, respectively. For example, the second angle or angular range, respectively, herein is equal to the first angle or angular range, respectively. It is furthermore contemplated for the angles or angular ranges, respectively, to be mutually different such that the second angle or angular range, respectively, is smaller or larger than the first angle or angular range, respectively.

The invention herein is in particular based on the concept that rotating shaft-to-hub connections are used in drive trains for motor vehicles, in particular for automobiles such as, for example, passenger motor vehicles. This means, for example, that the shaft-to-hub connection is rotatable, relative to a further component of the drive train, about a rotation axis, or is driven by a drive motor, respectively, and on account thereof is rotated about the rotation axis. Such rotating shaft-to-hub connections at high rotating speeds are subjected to high centrifugal forces. The longitudinal press-fit herein represents a particularly cost-effective force-fitting or friction-fitting, respectively, connection between the shaft element and the hub element, wherein the shaft element and the hub element are connected to one another at least in a rotationally-fixed manner by way of the force-fitting or friction-fitting, respectively, connection. The shaft element by way of the longitudinal press-fit is preferably also established on the hub element in the axial direction of the shaft element such that relative rotations as well as relative displacements between the hub element and the shaft element are avoided by way of the longitudinal press-fit. The longitudinal press-fit herein, by virtue of high expansion differentials between an external diameter of the shaft element and an internal diameter of the hub or the hub element, respectively, should be conventionally conceived so as to have a high minimum excess so as to avoid the hub element being lifted from the shaft element. The excess calculation according to DIN 7190, for example, is based on the transmittable torque, in particular the maximum torque, that is transmittable between the hub element and the shaft element.

In the calculation pertaining to the construction or the design of a longitudinal press-fit, respectively, a so-called fail-safe rotating speed as well as an operating rotating speed, the latter being lower in relation to the fail-safe rotating speed, are conventionally considered. Respective centrifugal forces that act on the shaft-to-hub connection at the fail-safe rotating speed and at the operating rotating speed are also considered. For example, the operating rotating speed is a maximum rotating speed which can arise in the drive train during operation. The consideration of the fail-safe operating speed represents an additional degree of safety, or an additional safety margin, respectively, as it is assumed that the shaft-to-hub connection when designed with a view to the fail-safe rotating speed can also withstand centrifugal forces which act on the shaft-to-hub connection at the operating rotating speed without the hub element being lifted from the shaft element. The consideration of the centrifugal forces at the fail-safe rotating speed however increases the requirement in terms of the excess, as compared to the consideration of only the centrifugal forces at the operating rotating speed. On account thereof, a particularly high contact pressure between the longitudinal regions is usually required. Moreover, a particularly high joining force is required in order for the shaft element to be joined to the hub element, that is to say in order for the longitudinal press-fit to be produced. By virtue of said high joining force and the high contact pressure, damage to the shaft element and/or the hub element can potentially arise during a joining procedure in the context of which the longitudinal press-fit is produced. For example, the longitudinal press-fit in the context of the joining procedure is produced in such a manner that the hub element is pressed onto the shaft element, in particular onto the first longitudinal region, under an axial force, or the shaft element is pressed into the hub and thus into the hub element, in particular into the second longitudinal region, under an axial force.

In order for a particularly rotationally-fixed connection between the shaft element and the hub element to be implemented, and damages herein to be avoided during the joining procedure, a contact proportion that runs in the circumferential direction and/or a distribution of respective contact faces by way of which the shaft element contacts the hub element can be reduced, for example. However, this results in only a very minor total contact face by way of which the hub element is in overall contact with the shaft element, or vice versa, respectively. Such a minor contact proportion has a negative influence on the thermal resistance of the shaft-to-hub connection as well as on the transmittable torque.

However, the aforementioned damage during the joining procedure can arise when the contact proportion is increased while maintaining a particularly fixed connection between the shaft element and the hub element. There is thus usually a conflict in terms of competing objectives between the implementation of a high contact proportion, which is advantageous in terms of the above-mentioned properties, and the implementation of a minor contact proportion in order for damage during the joining procedure to be avoided. This conflict in terms of competing objectives can be a knock-out criterion for the longitudinal press-fit as a connecting or joining method, respectively, that in the respective applications represents a favorable friction-fitting connection.

The above-mentioned issues and disadvantages can now however be avoided by way of the shaft-to-hub connection according to the invention, such that the longitudinal press-fit can be used as a cost-effective, friction-fitting or force-fitting, respectively, connection between the hub element and the shaft element. In the case of the shaft-to-hub connection according to the invention, by virtue of the variable excess, it is specifically possible for a particularly high contact proportion to be achieved between the hub element and the shaft element yet to keep the probability of damages arising in the joining procedure particularly low. The shaft-to-hub connection according to the invention, as compared to conventional shaft-to-hub connections, at identical parameters in terms of costs, joining force, joining temperature, installation space, and weight, for example, thus enables the implementation of a higher cooling output should cooling of the hub element by way of the shaft element (or vice versa) be desired. Furthermore, the hub element and the shaft element can be connected to one another in a particularly cost-effective manner by way of the longitudinal press-fit. At the same time, a particular fixed or stable connection, respectively, can be implemented between the hub element and the shaft element such that the shaft-to-hub connection can also withstand high rotating speeds without the hub element being lifted from the shaft element.

The longitudinal press-fit herein has significant cost advantages as compared to thermally joined shrink-fits such that the longitudinal press-fit can be produced at shorter cycle times and at a lower energy input and thus at lower energy costs as compared to the production of a thermally joined shrink-fit. The costs can likewise be reduced as compared to a form-fitting connection between the shaft element and the hub element since, for example, an external contour of the shaft element and/or an internal contour of the hub element, or the hub, respectively, can be designed in a particularly simple and thus cost-effective manner.

It is a particular background to the invention herein that certain functions of the shaft-to-hub connection such as, for example, adequate cooling, usually has to provide the full functionality thereof only up to the operating rotating speed which is lower in relation to the fail-safe rotating speed. The invention thus exploits the different expectations set for the functions of the shaft-to-hub connection between the maximum operating rotating speed and the fail-safe rotating speed. The fail-safe rotating speed is usually higher than the maximum operating rotating speed, in order for a safety margin to be implemented. In order for the latter to be implemented, the at least two excess regions are provided with the different excesses such that the longitudinal press-fit in the circumferential direction of the shaft element has a variable excess. For example, the second excess region is designed for the operating rotating speed such that lifting of the hub element from the shaft element in the second excess region does not arise until the operating rotating speed is reached. The second excess region herein is assigned the functions of cooling, in particular hub cooling, and torque transmission, for example.

The first excess region has the first excess that is larger in relation to the second excess. Lifting of the hub element from the shaft element in the first excess region thus does not arise until the fail-safe rotating speed is reached, for example. The first excess region herein is assigned the functions of strength up to the fail-safe rotating speed, torque transmission, and centering, for example. A functional separation, or functional split, respectively, is thus achieved in terms of the excess regions, on account of which the conflict in terms of competing objectives described above can be solved in a manner that is favorable in terms of weight and cost.

In one particularly advantageous embodiment of the invention at least one intermediate region in which the shaft element is spaced apart from the hub element in the radial direction of the shaft element is disposed so as to be between the excess regions in the circumferential direction of the shaft element. For example, a gap, in particular an air gap, is provided in the intermediate region so as to be disposed in the radial direction of the shaft element between the latter and the hub element. A particular advantageous connection between the hub element and the shaft element can be implemented on account thereof.

In order to be able to keep the costs of the shaft-to-hub connection particularly low, it is provided in a further design embodiment of the invention that the shaft element is connected in a rotationally-fixed manner to the hub element exclusively by way of the press-fit.

A further embodiment is distinguished in that the hub element is configured as part of a rotor of an electric machine.

A second aspect of the invention relates to a drive train for a motor vehicle which is configured, for example, as an automobile, in particular as a passenger motor vehicle. The drive train comprises at least one shaft-to-hub connection, in particular at least one shaft-to-hub connection according to the invention. The shaft-to-hub connection includes a hub element having a hub and a shaft element which has a first longitudinal region. The first longitudinal region is disposed in at least one second longitudinal region of the hub, wherein the shaft element by way of a longitudinal press-fit that includes the longitudinal regions is connected to the hub element at least in a rotationally-fixed manner.

In order for particularly advantageous cooling to now be able to be implemented in a manner that is favorable in terms of cost, installation space, and weight, it is provided according to the invention that the longitudinal press-fit has at least one first excess region having a first excess and, so as to follow the first excess region in the circumferential direction of the shaft element, at least one second excess region having a second excess that is smaller in relation to the first excess. Advantages and advantageous design embodiments of the first aspect of the invention are to be seen as advantages and advantageous design embodiments of the second aspect of the invention, and vice versa.

Other objects, advantages and novel features of the present invention will become apparent from the following detailed description of one or more preferred embodiments when considered in conjunction with the accompanying drawing.

BRIEF DESCRIPTION OF THE DRAWING

Further details of the invention will be derived from the description hereunder of a preferred exemplary embodiment and the designated drawing. FIG. 1 herein is in fragments a schematic cross-sectional view of a shaft-to-hub connection for a motor vehicle, having a hub element and having a shaft element which by way of a longitudinal press-fit is connected to the hub element at least in a rotationally-fixed manner, said longitudinal press-fit having a variable excess in the circumferential direction of the shaft element.

DETAILED DESCRIPTION OF THE DRAWING

FIG. 1 shows in fragments in a schematic cross-sectional view a shaft-to-hub connection for a drive train of a motor vehicle, said shaft-to-hub connection in its entirety being identified by the reference numeral 1. The shaft-to-hub connection 1 includes a hub element 2 and a shaft element 3 which is configured as a shaft, for example, the hub element 2 and the shaft element 3 being configured in the partial regions shown in FIG. 1 so as to be axially symmetrical in relation to an axis 4. For example, the hub element 2 is thus only half-shown in FIG. 1, wherein the right side of the hub element 2 in relation to the axis 4 is shown in FIG. 1. The explanations hereunder and above pertaining to the right side are readily transferable also to the left side of the hub element 2, and vice versa.

It can be seen from FIG. 1 that the hub element 2 has a hub 5 which is configured as a bore, for example. At least one longitudinal region 6 of the shaft element 3 herein is disposed or received, respectively, in the hub 5 and herein disposed or received, respectively, in at least one second longitudinal region 7 of the hub 5. Moreover, the shaft element 3 is connected to the hub element 2 at least in a rotationally-fixed manner by way of a longitudinal press-fit 8 that includes the longitudinal regions 6 and 7, such that relative rotations between the hub element 2 and the shaft element 3 are avoided on account of the longitudinal press-fit 8. It is preferably provided that the shaft element 3 is also established in the axial direction of the shaft element 3 on the hub element 2 by way of the longitudinal press-fit 8 such that relative displacements between the hub element 2 and the shaft element 3 in the axial direction of the shaft element 3 are also avoided on account of the longitudinal press-fit 8.

For example, the shaft-to-hub connection 1 is configured as a rotating or rotatable, respectively, shaft-to-hub connection such that the shaft-to-hub connection 1, relative to at least one further construction component of the drive train, are rotatable about a rotation axis 9. The hub element 2 is configured, for example, as a laminated core of a rotor of an electric machine of the drive train. The motor vehicle herein is drivable by way of the electric machine, for example. The electric machine herein is capable of being operated in a motor operation, for example, and thus as an electric motor by way of which the motor vehicle is capable of being driven. In order for the electric machine to be operated in the motor operation, the electric machine is supplied, for example, with electric power, or an electric current, respectively, in particular from a power accumulator.

The electric machine herein includes the rotor mentioned and a stator by means of which the rotor and thus the shaft-to-hub connection 1 are capable of being driven, for example. The rotor herein, relative to the stator, is rotatable about the rotation axis 9. The shaft element 3 herein is configured, for example, as a shaft of the electric machine, in particular of the rotor, such that the electric machine can provide torques for driving the motor vehicle by way of the shaft (shaft element 3), for example.

In order for the hub element 2 now to be able to be connected in a particularly fixed manner to the shaft element 3, and in order for particularly advantageous cooling of the shaft-to-hub connection 1 and thus of the electric machine overall to be able to be implemented at the same time, the longitudinal press-fit 8 has at least one first excess region 10 and, so as to follow the first excess region 10 in the circumferential direction of the shaft element 3, at least one second excess region 11. The circumferential direction of the shaft element 3 mentioned herein is visualized by an arrow 12 in FIG. 1. It can be seen from the figure that the longitudinal press-fit 8 has a plurality of first excess regions 10 that in the circumferential direction of the shaft element 3 are disposed in succession or behind one another, respectively, as well as a plurality of second excess regions 11 that in the circumferential direction of the shaft element 3 are disposed in succession or behind one another, respectively. The respective first excess region 10 herein has a first excess $U_B$, wherein the respective second excess region 11 has a respective second excess $U_A$. The second excess $U_A$ herein is smaller than the first excess $U_B$, or the second excess $U_A$ has a lower value than the first excess $U_B$, respectively. In other words:

$U_A < U_B$, or $U_B > U_A$.

Moreover preferably:

$U_A > 0$

This means that the second excess region 11 has a smaller diameter than the shaft element 3. In other words, it is preferably provided that the first excess $U_A$ is not 0 and not smaller than 0, but that $U_A$ is larger than 0, smaller than or equal to 0.

Furthermore, the respective first excess region 10 in the circumferential direction of the shaft element 3 extends across a first angle $\varphi_B$, wherein the respective second excess region 11 in the circumferential direction of the shaft element 3 extends across a second angle $\varphi_A$. Herein, optionally: $\varphi_A > \varphi_B$, or $\varphi_B < \varphi_A$.

For example, the second angle $\varphi_A$ can thus be larger than the first angle $\varphi_B$, wherein alternatively other ratios of the angles can be provided. The ratio mentioned above in the present exemplary embodiment means that the respective second excess region 11 has a larger contact proportion than the respective first excess region 10. However, other design embodiments are readily possible.

It can be seen from FIG. 1 that the shaft element 3 at least in the first longitudinal region 6 has an external diameter and thus an external circumference, wherein the hub 5 at least in the longitudinal region 7 has an internal diameter and an internal circumference, respectively. The respective excess is now formed, for example, in that the external diameter of the shaft element 3, in a state in which the shaft element 3 has not yet been joined to the hub element 2 by way of the longitudinal press-fit 8, in the respective excess region 10 or 11, respectively, is larger than the internal diameter of the hub 5 in the respective excess region 10 or 11, respectively. The aforementioned contact proportion describes a ratio between an extent of respective contact faces of the shaft element 3 and of the hub element 2 that runs in the circumferential direction of the shaft element 3, said shaft element 3 and said hub element 2 being in mutual contact and touching one another by way of the contact faces mentioned, and the external circumference of the shaft element 3 overall. The higher the contact proportion, the larger the extent of the contact faces mentioned that runs in the circumferential direction of the shaft element 3 in the respective excess region 10 or 11.

A particularly advantageous heat exchange and/or advantageous transmission of torque between the shaft element 3 and the hub element 2 can be implemented up to a specified rotating speed N1 on account of the contact proportion in the second excess regions 11. By contrast, the excess regions 10 serve for implementing a particularly fixed connection such that the shaft-to-hub connection 1 can withstand rotating speeds up to N2>N1 without the hub element 2 being lifted from the shaft element 3. The required joining force herein, by virtue of the variable excess, is lower than the joining force which would be required for joining a shaft-to-hub connection having an identical contact proportion and a constant excess $U_B$.

It can be seen from the figure that the excess regions 11 in the circumferential direction of the shaft element 3 are disposed between the excess regions 10. Furthermore, intermediate regions 13 in which the shaft element 3 is spaced apart from the hub element 2 in the radial direction of the shaft element 3 are disposed between the excess regions 10 and/or between the excess regions 11 and/or between at least one of the excess regions 10 and at least one of the excess regions 11. A gap, in particular an air gap, which in the radial direction is disposed between the shaft element 3 and the hub element 2 is thus provided in the respective intermediate region 13, for example. The excess regions 10 and 11 and the intermediate regions 13 can be disposed in another sequence in the circumferential direction than the sequence shown.

LIST OF REFERENCE SIGNS

1 Shaft-to-hub connection
2 Hub element
3 Shaft element
4 Axis
5 Hub
6 First longitudinal region
7 Second longitudinal region
8 Longitudinal press-fit
9 Rotation axis
10 First excess region
11 Second excess region
12 Double arrow
13 Intermediate region $U_A$ Second excess
$U_B$ First excess
$\varphi_A$ Second angle
$\varphi_B$ First angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shaft-to-hub connection, comprising:
   a hub element including a hub; and
   a shaft element which includes a longitudinal region which is disposed in a longitudinal region of the hub and which is connected to the hub element at least in a rotationally-fixed manner by way of a longitudinal press-fit that includes the longitudinal region of the shaft element and the longitudinal region of the hub, wherein
   the longitudinal press-fit includes:
      at least one first excess region formed in the hub and having a first excess;
      at least one second excess region formed in the hub and having a second excess that is smaller in relation to the first excess; and
      at least one intermediate region in which the shaft element is spaced apart from the hub element in a radial direction of the shaft element,
      wherein the at least one first excess region is circumferentially adjacent to the at least one second excess region in a circumferential direction of the shaft element, with the at least one intermediate region disposed between the at least one first excess region and the at least one second excess region in the circumferential direction of the shaft element.

2. The shaft-to-hub connection according to claim 1, wherein
   the longitudinal press-fit further comprises at least one third excess region having a third excess that is different in relation to the second excess, wherein the at least one third excess region is circumferentially adjacent to the at least one second excess region in the circumferential direction of the shaft element.

3. The shaft-to-hub connection according to claim 1, wherein
   the at least one first excess region extends across a first angle in the circumferential direction of the shaft element, and
   the at least one second excess region extends across a second angle that differs from the first angle in the circumferential direction of the shaft element.

4. The shaft-to-hub connection according to claim 2, wherein
   the at least one first excess region extends across a first angle in the circumferential direction of the shaft element, and
   the at least one second excess region extends across a second angle that differs from the first angle in the circumferential direction of the shaft element.

5. The shaft-to-hub connection according to claim 1, wherein the shaft element is connected in a rotationally-fixed manner to the hub element exclusively by way of the longitudinal press-fit.

6. The shaft-to-hub connection according to claim 1, wherein the shaft element is connected in a rotationally-fixed manner to the hub element exclusively by way of the longitudinal press-fit.

7. The shaft-to-hub connection according to claim 1, wherein the hub element is configured as part of a rotor of an electric machine.

8. The shaft-to-hub connection according to claim 6, wherein the hub element is configured as part of a rotor of an electric machine.

9. The shaft-to-hub connection according to claim 1, wherein the shaft element is configured as a shaft of an electric machine.

10. The shaft-to-hub connection according to claim 6, wherein the shaft element is configured as a shaft of an electric machine.

11. A drive train for a motor vehicle, comprising:
    at least one shaft-to-hub connection which comprises a hub element including a hub and a shaft element which has a longitudinal region which is disposed in a longitudinal region of the hub and which is connected to the hub element at least in a rotationally-fixed manner by way of a longitudinal press-fit that includes the longitudinal region of the shaft element and the longitudinal region of the hub, wherein
    the longitudinal press-fit includes:
       at least one first excess region formed in the hub and having a first excess;
       at least one second excess region formed in the hub and having a second excess that is smaller in relation to the first excess; and
       at least one intermediate region in which the shaft element is spaced apart from the hub element in a radial direction of the shaft element,
       wherein the at least one first excess region is circumferentially adjacent to the at least one second excess region in a circumferential direction of the shaft element, with the at least one intermediate region disposed between the at least one first excess region and the at least one second excess region in the circumferential direction of the shaft element.

* * * * *